United States Patent [19]

Yamamoto

[11] Patent Number: 4,796,838

[45] Date of Patent: Jan. 10, 1989

[54] HOSE REEL MONITOR FOR INFLIGHT REFUELING SYSTEM

[75] Inventor: Tsutomu Yamamoto, Fountain Valley, Calif.

[73] Assignee: The United States of America as represented by the Secretary of the Air Force, Washington, D.C.

[21] Appl. No.: 144,885

[22] Filed: Jan. 14, 1988

[51] Int. Cl.⁴ .............................................. B64D 39/02
[52] U.S. Cl. ................................................. 244/135 A
[58] Field of Search ....................... 244/135 A, 1 TD

[56] References Cited

U.S. PATENT DOCUMENTS

| 2,954,190 | 9/1960 | LeClair | 244/135 A |
| 2,973,163 | 2/1961 | Goodliffe et al. | 244/135 A |
| 3,008,674 | 11/1961 | Abraham | 244/135 A |
| 4,327,784 | 5/1982 | Denniston | 244/135 A |

FOREIGN PATENT DOCUMENTS 1556818  4/1973  Fed. Rep. of Germany ... 244/135 A

Primary Examiner—Galen Barefoot
Assistant Examiner—Rodney Corl
Attorney, Agent, or Firm—Robert L. Nathans; Donald J. Singer

[57] ABSTRACT

A bank of comparators is utilized to control a logic circuit which indicates proper system operation when measured hydraulic real motor control pressures are within normal limits for the current airspeed after hose deployment. Also, before such deployment, simulated test signals are applied to the comparators to ensure proper operation of the comparators and logic circuitry.

1 Claim, 3 Drawing Sheets

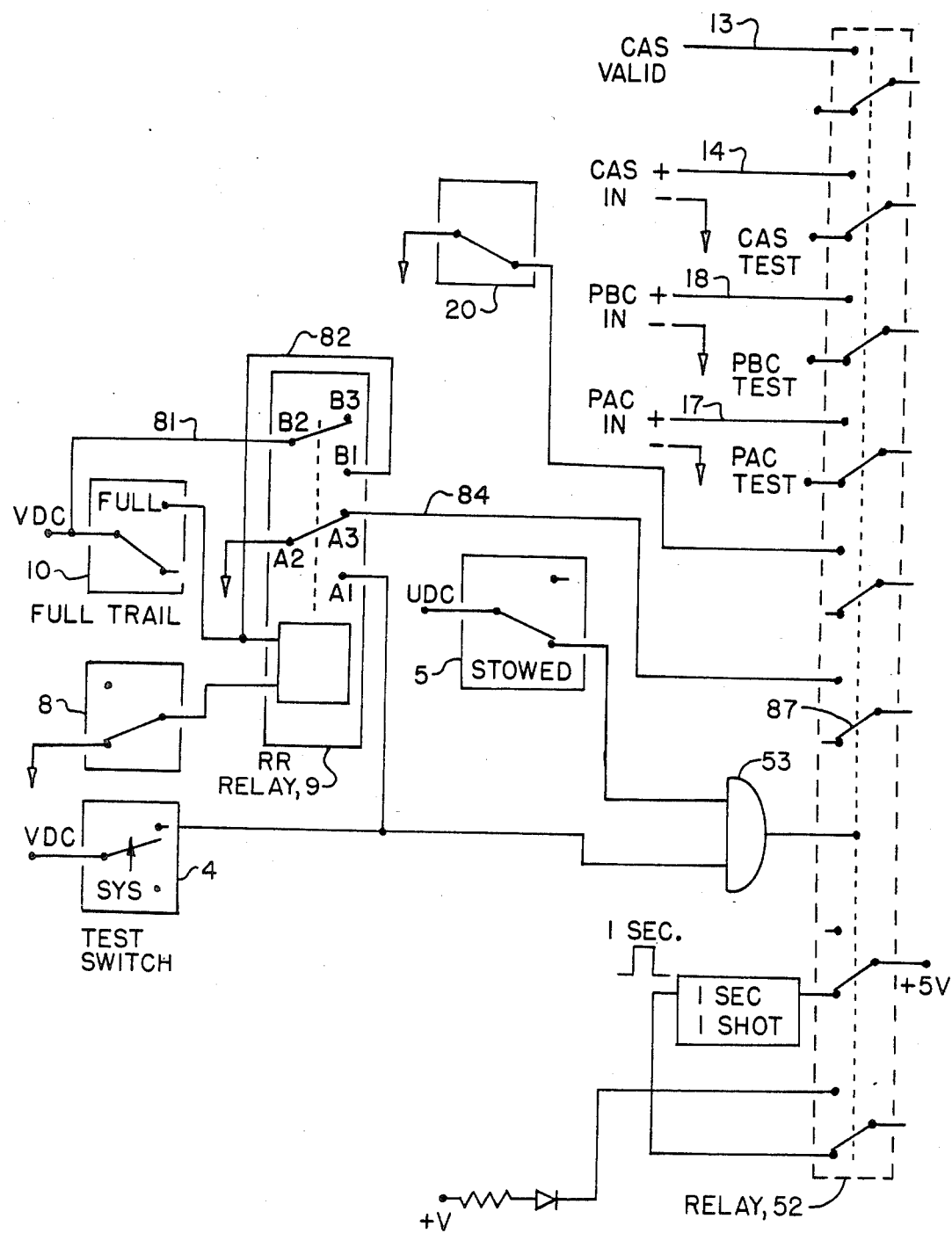
FIG. IA

HOSE REEL MONITOR FOR INFLIGHT REFUELING SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates to inflight aircraft refueling systems.

As is well-known, hydraulic motors are used to drive the hose reel in a controlled manner to limit the speed of play-out of the refueling hose, and to take up slack produced by aircraft airspeed variations. Hydraulic pressure changes within accumulators are employed to control the hydraulic motors, as a function of changes in airspeed, as explained in detail in U.S. Pat. No. 3,008,674 issued to Abraham, and incorporated by reference herein.

SUMMARY OF THE INVENTION

A bank of comparators is utilized to control a logic circuit which indicates proper system operation when measured hydraulic reel motor control pressures are within normal limits for the current airspeed after hose deployment. Also, before such deployment, simulated test signals are applied to the comparators to ensure proper operation of the comparators and logic circuitry.

BRIEF DESCRIPTION OF THE DRAWINGS

Other objects, features and advantages of the present invention will become apparent upon study of the following more specific description taken in conjunction with the drawings in which.

DETAILED DESCRIPTION OF THE PREFERRED EMBODIMENT

Figure 1B:
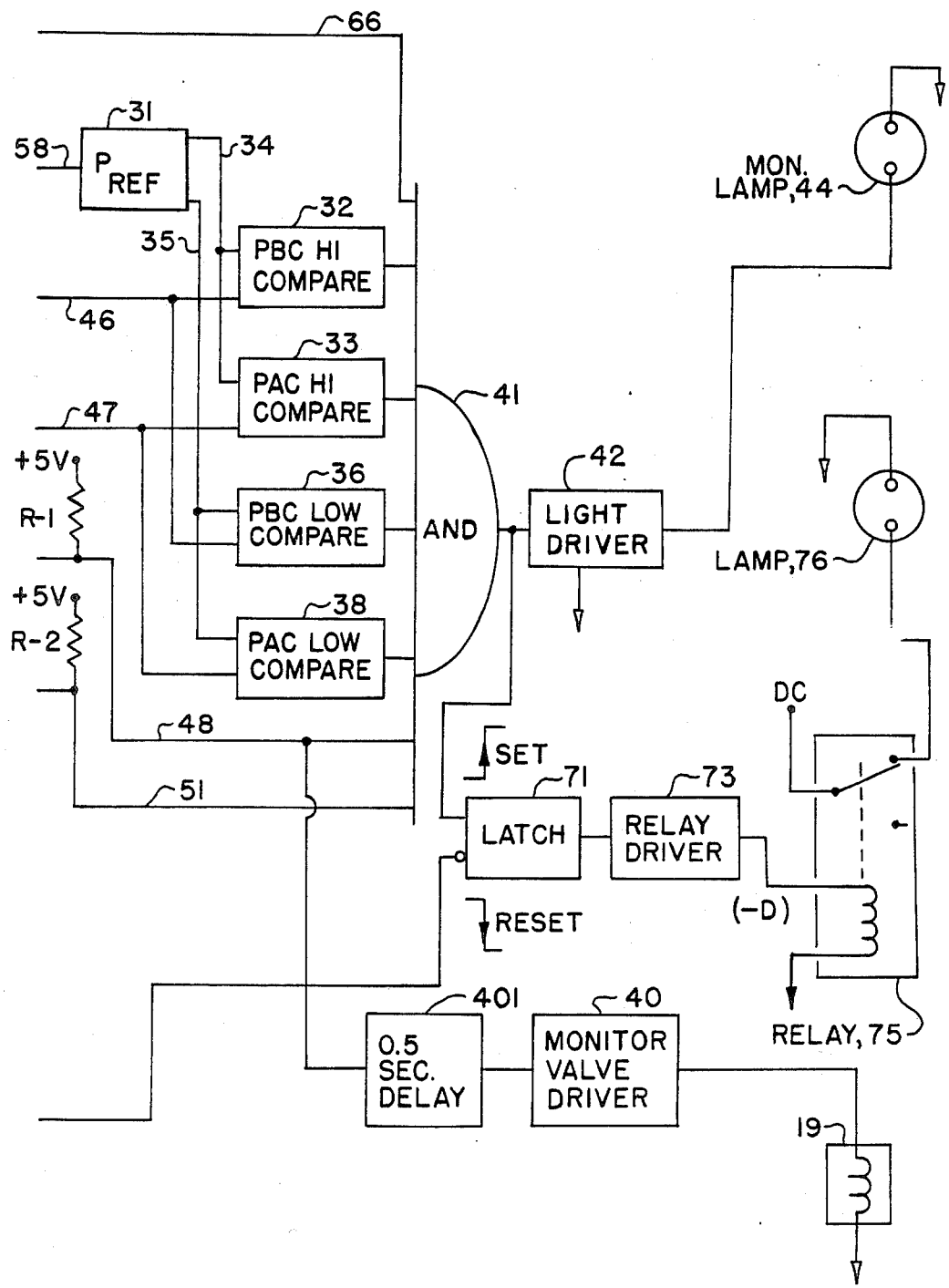
FIGS. 1 and 2 illustrate a preferred embodiment of the invention.
Figure 2:
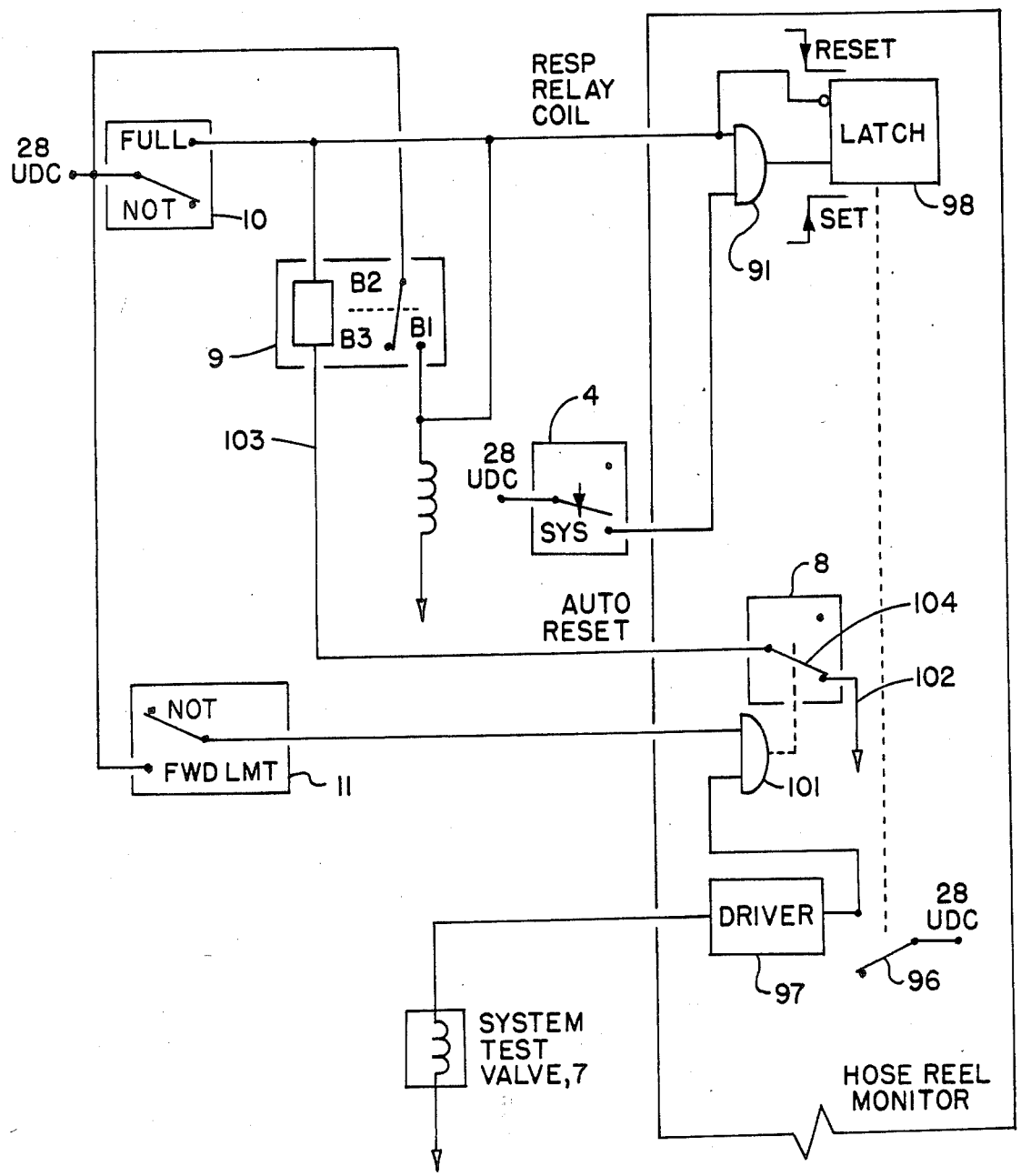

The aforesaid objects are carried out by the monitor system shown in FIGS. 1 and 2. The system senses control valve pressures and compares the sensed pressures against a reference pressure signal derived by the air data computer output, from the tanker airspeed; see the Abraham patent. Hence the cas signal, proportional to the computed airspeed (cas), is applied to signal reference generator 31 via lead 14. More specifically, the monitor uses the IAS-2B air data computer output to compute reference signals used by the comparator pairs to monitor the signal outputs of the pressure transducers installed in the hydraulic accumulators (Pac) (on lead 17) and the hydraulic boost cylinder (Pbc on lead 18). The pressures sensed during monitor operation are proportional to the control port pressures of the hydraulic reel motor control valve. These pressures are compared to high and low limits of the computed reference value present on lead 34 and 35. The limits were established from flight and ground test data and represent normal ranges of pressure variations in an operational system.

$$P_{REF} \text{(generated within unit 31)} = 1240 * 10 \frac{((CAS-200)/377)} \quad (1)$$

$$\text{HIGH LIMIT} = P_{REF} \times 1.15 \, (+15\%) \quad (2)$$

$$\text{LOW LIMIT} = P_{REF} \times 0.85 \, (-15\%) \quad (3)$$

Signal generator 31 may consist of any analog or digital computer circuit of numerous configurations for producing signals in accordance with equations (1), (2), and (3).

The system first tests itself prior to hose deployment (drogue stowed) and checks the proper functioning of the monitor electronics. Simulated analog signals are applied during testing at cas-test terminal to the input lead 58 of the P-ref voltage generator 31, which in turn computes a high reference limit upon lead 34 and a low reference limit upon lead 35. The initial self-test begins when switch 4 is actuated, to put a binary one (positive voltage) or true value at the lower input terminal of AND gate 53. Such true signals will be abbreviated as T-sig throughout the following description, whereas binary zero or false indications will be abbreviated by F-sig. A T-sig is also applied to the upper input terminal of and gate 53 by drogue stowed switch 5, which fully enables the self-test and gate 53 but only in the drogue stowed position. AND gate 53 actuates relay 52 to cause all armatures thereof to assume the lower position illustrated in FIG. 1. The aforesaid simulated analog signals are thus applied to the reference source 31; Pbc test to comparator 32, and comparator 36 via 46, whereas the simulated analog signal Pac test on lead 47 is applied to comparator 33 and 38 as illustrated. At this time, T-sigs are applied over leads 48 and 51 (r-1 and r-2 are ungrounded), and lead 66, to partially enable AND gate 41. Assuming the signals upon leads 46 and 47 are within the high and low reference limit levels, comparators 32, 33, 36 and 38, if operative, will apply T-sigs to AND gate 41 to fully enable the AND gate, and thus a T-sig is applied to driver circuit 42 which causes the response monitor lamp 44 to light. This indicates that the simulated signals are of the proper value and that the comparators, AND gate, driver 42 and lamp are functioning properly. The T-sig applied to driver 42 will also actuate latch 71 and driver 73, de-energizing drogue yellow light relay 75 thereby to illuminate yellow light 76.

Actuating test switch 4, now disables AND gate 53 to cause all armatures to resume the upward position disconnecting the analog test signals from the comparators, and coupling the "real world" signals to the comparators; namely signals produced by the pressure transducers actually installed in the accumulators (Pac sig on lead 17, and from the boost cylinder transducer (Pbc sig) on lead 18, rather than the test signals previously applied during the self-test, AND gate 41 is now disenabled since lead 84 and thus lead 51 are grounded via A2-A3. The hose-drogue system is now ready for operation.

Actual system test may be accomplished when the drogue is at the full trail position. When the full trail drogue limit position is reached, switch 10 energizes the reel response relay 9 (hereinafter RR relay) which in turn lowers the armatures to cause the relay to be latched via leads 81, 82 and autoreset switch 8, having its lower terminal grounded as illustrated in FIG. 1. Since ground is no longer applied to lead 84 due to the actuation of RR relay 9, and since armature 87 is now in the upward position, ground is removed from lead 51 coupled to AND gate 41, to enable it again, turning both lamps back on. As indicated in FIG. 2, by toggling test switch 4 to the system position, the system test valve 7 is actuated. This occurs since AND gate 91 is fully enabled by the full trail switch 10, as the hose is fully extended, and a T-signal from test switch 4, as illustrated in FIG. 2, to cause latch 98 to raise armature 96 to the upper position, in turn causing driver circuit 97 to actuate the system test valve 7. As a result, the hydraulic pressure at the sensing cylinder of the hose reel control valve is reduced to cause the reel to rewind. The monitor circuit detects the reduction of pressure upon the actuation of valve 7 to turn off the response normal light 44. This action occurs because the comparators 36 and 38 produce F-signals at their output since the inputted signals have dropped below the lower limit produced by reference source 31 on lead 35. Hose winding continues until the forward limit of the refueling range is reached, causing forward limit switch 11 to enable AND gate 101 to in-turn remove the ground condition at 102 from lower terminal 103 of RR relay 9, by raising armature 104. Ground or F-sig is now applied to the upper reset terminal of latch 98, to in turn again disable system test driver 97, and system test valve 7. The drogue now returns to the full trail position, to again energize the RR relay to in turn fully enable AND gate 41, as ground is removed from leads 84 and 51 and A-3. As a result, the response monitor lamp 44 is illuminated to signal the operator that the system is operational. At this time, T-sig at the output of AND gate 41, also causes drogue yellow lamp 76 to be illuminated, via latch 71, driver 73 and the now de-energized lamp relay 75. The operation of the Monitor Valve 19 (via 40, 40', 48) is checked by pressure switch 20. Proper operation provides a logic signal which is used to control the output of the monitor. A logic discrete from the response relay 9 is also used for output control phasing of the monitor. Thus, the monitor operation starts when the drogue reaches full trail condition and continues until reset or rewind functions are selected.

What is claimed is:

1. Aircraft inflight fuel transfer hose reel monitor system having a boost cylinder and an accumulator, comprising:
   a first signal source for producing a first signal proportional to actual hydraulic pressure within said boost cylinder;
   a second signal source for producing a second signal proportional to actual hydraulic pressure within said accumulator;
   first, second, third and fourth comparator means each having first and second input terminals and an output terminal;
   reference signal generator means for applying an upper limit reference signal derived from an airspeed related computed reference voltage to the first input terminal of said first and second comparator, and for applying a lower limit reference signal, derived from said computed reference voltage to the first input terminal of said third and fourth comparator;
   a first test signal source for producing a first simulated test signal representing a normal value of hydraulic pressure within said boost cylinder;
   a second test signal source for producing a second simulated test signal representing a normal value of hydraulic pressure within said accumulator;
   indicator means coupled to the output terminals of said first, second, third and fourth comparators for producing an output indication only if signals applied to the second input terminals of all of said comparators have values lying between said lower limit and said upper limit; and
   switching means for coupling said first and second simulated test signals to the second input terminals of said comparators during a self test interval, and for thereafter coupling said first and second actual hydraulic pressure signals to the second input terminals of said comparators after deployment of said hose.

* * * * *